United States Patent
Inomata

(12) United States Patent (10) Patent No.: US 6,670,057 B2
(45) Date of Patent: Dec. 30, 2003

(54) MAGNETIC RECORDING MEDIUM AND MAGNETIC STORAGE APPARATUS

(75) Inventor: Akihiro Inomata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 10/068,662

(22) Filed: Feb. 6, 2002

(65) Prior Publication Data

US 2003/0049461 A1 Mar. 13, 2003

(30) Foreign Application Priority Data

Sep. 7, 2001 (JP) .......................... 2001-272601

(51) Int. Cl.[7] .............................. G11B 5/66; G11B 5/70; H01J 1/00
(52) U.S. Cl. ............................ 428/694 TM; 428/900; 428/212; 428/611
(58) Field of Search ................. 428/694 TM, 212, 428/611, 900

(56) References Cited

U.S. PATENT DOCUMENTS 6,280,813 B1  8/2001  Carey et al. ............... 428/65.3

FOREIGN PATENT DOCUMENTS

EP       0 388 088 A2     9/1990
WO       WO 93/12928      7/1993

OTHER PUBLICATIONS

Schabes et al., "Theory of Antiferromagnetically Coupled Magnetic Recording Media", Jul. 2001, IEEE Trans Magn, vol. 37, No. 4, pp. 1432–1434.*

Wang et al., "Anti–Ferromagnetic Coupling Effects on Energy Barrier and Reversal Properties of Recording Media", Jul. 2001, IEEE Trans Magn, vol. 37, No. 4, pp. 1445–1448.*

* cited by examiner

Primary Examiner—Holly Rickman
(74) Attorney, Agent, or Firm—Greer, Burns & Crain, Ltd.

(57) ABSTRACT

A magnetic recording medium includes a first magnetic layer, a second magnetic layer, and a non-magnetic coupling layer provided between the first and second magnetic layers so that the first and second magnetic layers are exchange-coupled and the magnetizations of the first and second magnetic layers are antiparallel. The first magnetic layer has an exchange coupling field Hex1 which is larger than the respective coercivities Hc1 and Hc2 of the first and second magnetic layers.

17 Claims, 5 Drawing Sheets

I  III

I  II  III

MAGNETIC RECORDING MEDIUM AND MAGNETIC STORAGE APPARATUS

BACKGROUND OF THE INVENTION

This application claims the benefit of a Japanese Patent Application No. 2001-272601 filed Sep. 7, 2001, the disclosure of which is hereby incorporated by reference.

1. Field of the Invention

The present invention generally relates to magnetic recording media and magnetic storage apparatuses, and more particularly to a magnetic recording medium which is suited for high-density recording and capable of carrying out high-speed recording and reproduction, and to a magnetic storage apparatus which uses such a magnetic recording medium.

2. Description of the Related Art

Due to the developments in information processing technology, there are increased demands for high-density magnetic recording media. For example, for a hard disk, the magnetic recording media required to satisfy such demands should include such characteristics as low noise and improved thermal stability.

The recording density of longitudinal magnetic recording media, such as magnetic disks, has been increased considerably due to the reduction of medium noise and the development of magnetoresistive and high-sensitivity spin-valve heads. A typical magnetic recording medium is comprised of a substrate, an underlayer, a magnetic layer, and a protection layer which are successively stacked in this order. The underlayer is made of Cr or a Cr alloy, and the magnetic layer is made of a Co alloy.

Various methods have been proposed to reduce the medium noise. For example, Okamoto et al., "Rigid Disk Medium For 5 Gbit/in² Recording", AB-3, Intermag '96 Digest, proposes decreasing the grain size and size distribution of the magnetic layer by reducing the magnetic layer thickness by the proper use of an underlayer made of CrMo. U.S. Pat. No. 5,693,426 proposes the use of an underlayer made of NiAl. Further, Hosoe et al., "Experimental Study of Thermal Decay in High-Density Magnetic Recording Media", IEEE Trans. Magn. Vol. 33, 1528 (1997), for example, proposes the use of an underlayer made of CrTiB. The underlayers described above also promote c-axis orientation of the magnetic layer in a plane which increases the remanence magnetization and the thermal stability of the written bits. In addition, proposals have been made to reduce the thickness of the magnetic layer, to increase the resolution or to decrease the width of the transition between written bits. Furthermore, proposals have been made to decrease the exchange coupling between grains by promoting more Cr segregation in a magnetic layer which is made of the CoCr alloy.

However, as the grains of the magnetic layer become smaller and more magnetically isolated from each other, the written bits become unstable due to thermal activation and to demagnetizing fields which increase with linear density. Lu et al., "Thermal Instability at 10 Gbit/in² Magnetic Recording", IEEE Trans. Magn. Vol.30, 4230 (1994) demonstrated, by micromagnetic simulation, that exchange-decoupled grains having a diameter of 10 nm and the ratio $K_u V/k_B T \sim 60$ in 400 kfci di-bits are susceptible to significant thermal decay, where $K_u$ denotes the magnetic anisotropy constant, V denotes the average magnetic grain volume, $k_B$ denotes the Boltzmann constant, and T denotes the temperature. The ratio $K_u V/k_B T$ is also referred to as a thermal stability factor.

It has been reported in Abarra et al., "Thermal Stability of Narrow Track Bits in a 5 Gbit/in² Medium", IEEE Trans. Magn. Vol. 33, 2995 (1997), that the presence of intergranular exchange interaction stabilizes written bits, as demonstrated by MFM studies of annealed 200 kfci bits on a 5 Gbit/in² CoCrPtTa/CrMo medium. However, more grain decoupling is essential for recording densities of 20 Gbit/in² or greater.

The obvious solution has been to increase the magnetic anisotropy of the magnetic layer. But unfortunately, the increased magnetic anisotropy places a great demand on the head write field which degrades the "overwrite" performance, which is the ability to write over previously written data.

In addition, the coercivity of thermally unstable magnetic recording medium increases rapidly with decreasing switching time, as reported in He et al., "High Speed Switching in Magnetic Recording Media", J. Magn. Magn. Mater. Vol. 155, 6 (1996), for magnetic tape media, and in J. H. Richter, "Dynamic Coercivity Effects in Thin Film Media", IEEE Trans. Magn. Vol. 34, 1540 (1997), for magnetic disk media. Consequently, adverse effects are introduced in the data rate, that is, how fast data can be written on the magnetic layer and the amount of head field required to reverse the magnetic grains.

On the other hand, another proposed method of improving the thermal stability increases the orientation ratio of the magnetic layer by appropriately texturing the substrate under the magnetic layer. For example, Akimoto et al., "Relationship Between Magnetic Circumferential Orientation and Magnetic Thermal Stability", J. Magn. Magn. Mater. (1999), in press, report through micromagnetic simulation that the effective ratio $K_u V/k_B T$ is enhanced by a slight increase in the orientation ratio. This further results in a weaker time dependence for the coercivity which improves the overwrite performance of the magnetic recording medium, as reported in Abarra et al., "The Effect of Orientation Ratio on the Dynamic Coercivity of Media for >15 Gbit/in² Recording", EB-02, Intermag '99, Korea.

Furthermore, keepered magnetic recording media have been proposed for thermal stability improvement. The keeper layer is made up of a magnetically soft layer that is parallel to the magnetic layer. This soft layer can be disposed either above or below the magnetic layer. Oftentimes, a Cr isolation layer is interposed between the soft layer and the magnetic layer. The soft layer reduces the demagnetizing fields in the written bits on the magnetic layer. However, coupling the magnetic layer to a continuously-exchanged coupled soft layer defeats the purpose of decoupling the grains of the magnetic layer. As a result, the medium noise increases.

In order to improve the thermal stability and to reduce the medium noise, magnetic recording media and magnetic storage apparatuses have been proposed in U.S. patent application Ser. No. 09/425,788 filed Oct. 22, 1999, which is incorporated herein by reference, and in which the assignee is the same as the assignee of this application. This previously proposed magnetic recording medium is comprised of at least one exchange layer structure, and a magnetic layer formed on the exchange layer structure, wherein the exchange layer structure includes a ferromagnetic layer and a non-magnetic coupling layer provided on the ferromagnetic layer and under the magnetic layer, and the ferromagnetic layer and the magnetic layer have antiparallel magnetizations. According to this previously proposed magnetic recording medium, it is possible to improve the thermal stability of the written bits, reduce the medium noise, and realize a high-density recording having a high reliability without adversely affecting the performance of the magnetic recording medium.

In other words, in this previously proposed magnetic recording medium, the non-magnetic coupling layer (or the non-magnetic exchange layer) is interposed between the ferromagnetic layer that forms a first magnetic layer and the magnetic layer that forms a second magnetic layer. When the structure includes first and second magnetic layers having antiparallel magnetizations, the first and second magnetic layers mutually cancel portions of the magnetizations. Hence, it is possible to increase the effective grain size of the magnetic layer without substantially affecting the resolution. Therefore, from the point of view of the grain volume, it is possible to increase the apparent thickness of the magnetic layer so as to realize a magnetic recording medium having a good thermal stability.

Accordingly, this previously proposed magnetic recording medium employs a basic structure made up of the ferromagnetic layer (the first magnetic layer) and the magnetic layer (the second magnetic layer), so as to improve the thermal stability and to reduce the medium noise.

When an external recording magnetic field is applied to this previously proposed magnetic recording medium, the first and second magnetic layers first assume parallel magnetizations, and when the recording magnetic field decreases to zero (residual magnetization state) thereafter, the magnetization of the first magnetic layer is switched and becomes antiparallel to the magnetization of the second magnetic layer.

However, as the recording density and the signal transfer rate increase, it becomes necessary to also increase the recording and reproducing speed. For this reason, the need to wait for the switching of the magnetization to occur in the first magnetic layer after recording may interfere with the realization of high-speed recording and reproduction.

In other words, the first and second magnetic layers of this previously proposed magnetic recording medium assume antiparallel magnetizations in the residual magnetization state, and when the external recording magnetic field is applied in this state, the first and second magnetic layers assume parallel magnetizations. Then, when the recording magnetic field thereafter decreases to zero to assume the residual magnetization state once again, the magnetization of the first magnetic layer is switched to become antiparallel to the magnetization of the second magnetic layer. During this process, it is necessary to wait for the first magnetic layer to naturally make the magnetization switch.

But when the recording speed is increased and recording to an adjacent bit is made before the first magnetic layer makes the magnetization switch, the position of the bit which is to be recorded may shift due to a counter magnetic field from the bit in the parallel magnetization state. In this case, a non-linear transition shift (NLTS) deteriorates, and adversely affects the recording.

On the other hand, when measures are taken to reduce the time from recording to reproduction, an abnormal signal is generated to prevent normal reproduction if the reproduction is carried out before the first magnetic layer is switched to the antiparallel magnetization state from the parallel magnetization state.

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium which has first and second magnetic layers with antiparallel magnetizations to realize improved thermal stability and reduced medium noise, and that is capable of carrying out magnetic recording and reproduction at a high speed, and to provide a magnetic storage apparatus which employs such a magnetic recording medium.

Still another object of the present invention is to provide a magnetic recording medium comprising a first magnetic layer, a second magnetic layer, and a non-magnetic coupling layer provided between the first and second magnetic layers so that the first and second magnetic layers are exchange-coupled and magnetizations of the first and second magnetic layers are antiparallel, where the first magnetic layer has an exchange coupling field Hex1 which is larger than respective coercivities Hc1 and Hc2 of the first and second magnetic layers. According to the magnetic recording medium of the present invention, the magnetizations of the first and second magnetic layers can be maintained antiparallel in a residual magnetization state, and it is possible to realize a high recording density and high-speed recording and reproduction.

A switching field Hsw* which switches the magnetization of the first magnetic layer to become parallel to the magnetization of the second magnetic layer may be set to a sum of the exchange coupling field Hex1 and the coercivity Hc1 of the first magnetic layer. In this case, it is possible to set a recording field within a range which does not reach the level of the switching field Hsw*, so that it is possible to positively realize a magnetic recording medium in which the magnetizations of the first and second magnetic layers are rotated while maintaining antiparallel magnetizations of the first and second magnetic layers.

A magnetization and thickness product t1Ms1 of the first magnetic layer is preferably smaller than a magnetization and thickness product t2Ms2 of the second magnetic layer, where t1 denotes a thickness of the first magnetic layer, Ms1 denotes a magnetization of the first magnetic layer, t2 denotes a thickness of the second magnetic layer, and Ms2 denotes a magnetization of the second magnetic layer. In this case, it is possible to increase the exchange coupling field Hex1 of the first magnetic layer having a small magnetization and thickness product t1Ms1, so that it is possible to more positively realize a magnetic recording medium in which the exchange coupling field Hex1 is larger than the coercivities Hc1 and Hc2 of the first and second magnetic layers.

The coercivity Hc1 of the first magnetic recording medium is preferably smaller than the coercivity Hc2 of the second magnetic recording medium. In this case, it is possible to determine a main-sub relationship of the first and second magnetic layers. In other words, it is possible to design a magnetic recording medium in which the second magnetic layer, which is set to have the large coercivity Hc2, is used as the main recording layer.

The magnetic recording medium may further comprise a coupling intensifying region, provided near the boundary of the non-magnetic coupling layer and at least one of the first and second magnetic layers, for intensifying the exchange coupling strength between the first and second magnetic layers. Further, the coupling intensifying region may be made of a material selected from a group consisting of Fe, Co, Ni and alloys thereof. With the coupling intensifying region, it is possible to obtain an exchange coupling field Hex which further increases the exchange coupling between the first and second magnetic layers.

A further object of the present invention is to provide a patterned medium comprising a recording surface, and a plurality of unit recording portions, provided on the recording surface, having boundaries which are separated among adjacent unit recording portions. Each of the plurality of unit recording portions preferably has a stacked structure comprising a first magnetic layer, a second magnetic layer, and a non-magnetic coupling layer provided between the first and second magnetic layers so that the first and second magnetic layers are exchange coupled and magnetizations of the first and second magnetic layers are antiparallel, where the first magnetic layer has an exchange coupling field Hex1 which is larger than respective coercivities Hc1 and Hc2 of the first and second magnetic layers. According to the patterned medium of the present invention, it is possible to realize a high recording density and high-speed recording and reproduction.

Another object of the present invention is to provide a magnetic storage apparatus comprising at least one magnetic recording medium, and at least one head for applying a field to the magnetic recording medium, where the magnetic recording medium comprises a first magnetic layer, a second magnetic layer, and a non-magnetic coupling layer provided between the first and second magnetic layers so that the first and second magnetic layers are exchange-coupled and magnetizations of the first and second magnetic layers are antiparallel, and the first magnetic layer has an exchange coupling field Hex1 which is larger than respective coercivities Hc1 and Hc2 of the first and second magnetic layers. According to the magnetic storage apparatus of the present invention, it is possible to realize high recording density and high-speed recording and reproduction.

The field from the head may be larger than a coercivity Hc2 of the second magnetic layer and smaller than a switching field Hsw* which switches the magnetization of the first magnetic layer to become parallel to the magnetization of the second magnetic layer. Moreover, the switching field Hsw* may be set to the sum of the exchange coupling field Hex1 and the coercivity Hc1 of the first magnetic layer. In these cases, it is possible to positively realize the high-speed recording.

Other objects and further features of the present invention will be apparent from the following detailed description when read in conjunction with the accompanying drawings.

DESCRIPTION OF THE PREFERRED EMBODIMENTS

Figure 1:
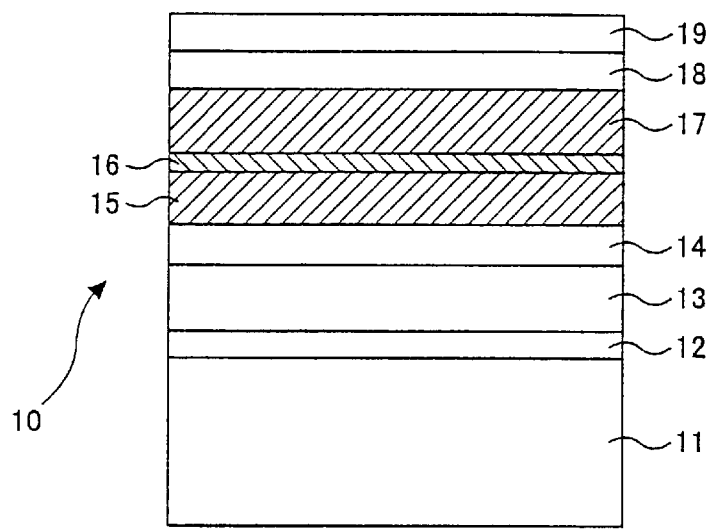
FIG. 1 is a cross-sectional view showing the main parts of one embodiment of a magnetic recording medium according to the present invention.

FIG. 1 is a cross-sectional view showing the main parts of one embodiment of a magnetic recording medium according to the present invention. A magnetic recording medium 10 shown in FIG. 1 includes a non-magnetic substrate 11, a seed layer 12, an underlayer 13, a non-magnetic intermediate layer 14, a first magnetic layer 15, a non-magnetic coupling layer 16, a second magnetic layer 17, and a protection layer 18 which are successively stacked in this order. The magnetic recording medium 10 can be produced by sputtering, for example. A lubricant layer 19 may further be provided on top of the protection layer 18.

The non-magnetic substrate 11 is made of for example, Al, glass or Si. The non-magnetic substrate 11 may be mechanically textured, if desired, but such texturing is not required.

The seed layer 12 may be made of NiP or NiAl, for example, but the seed layer 12 is preferably made of NiP, for example, especially in the case where the non-magnetic substrate 11 is made of Al or an Al alloy. The seed layer 12 may or may not be oxidized, and may or may not be mechanically textured. The seed layer 12 may be made of a B2 structure alloy such as NiAl and FeAl when the non-magnetic substrate 11 is made of glass, for example. The seed layer 12 is provided to promote a (001) or (112) texture of the underlayer 13 which is formed on the seed layer 12. The underlayer 13 may be made of Cr or a Cr alloy, similarly as in the case of a conventional magnetic recording medium.

In a case where the magnetic recording medium 10 is a magnetic disk, the mechanical texturing provided on the non-magnetic substrate 11 or the seed layer 12 which is made of NiP is made in a circumferential direction of the magnetic disk, that is, in the direction in which the tracks of the magnetic disk extend.

The non-magnetic intermediate layer 14 is provided to further promote epitaxy, narrow the grain distribution of the first magnetic layer 15, and orient the anisotropy axes (axes of easy magnetization) of the first magnetic layer 15 along a plane parallel to the recording surface of the magnetic recording medium 10. The non-magnetic intermediate layer 14 is made of an hcp structure alloy such as CoCr—M, where M=B, Mo, Nb, Ta, W, Cu or alloys thereof, and has a thickness in a range of 1 to 5 nm.

The first magnetic layer 15 is made of a material such as Co, Ni, Fe, Co alloy, Ni alloy or the like. In other words, Co alloys such as CoCr, CoCrTa, CoCrPt and CoCrPt—M, where M=B, Mo, Nb, Ta, W, Cu or alloys thereof, may be used for the first magnetic layer 15. Especially when using a Co alloy for the first magnetic layer 15, the Co concentration of the Co alloy may be set high, that is, the Co alloy may be Co rich, so as to increase the exchange coupling magnetic field (hereinafter simply referred to as an exchange coupling field), which will be described later. The first magnetic layer 15 preferably has a thickness in the range of 2 to 30 nm, for example.

The non-magnetic coupling layer 16 is made of a material such as Ru, Rh, Re, Ir, Cr, Cu, Ru alloy, Rh alloy, Re alloy, Ir alloy, Cr alloy, Cu alloy or alloys thereof. For example, when the non-magnetic coupling layer 16 is made of Ru, the non-magnetic coupling layer 16 has a thickness in the range of 0.4 to 1.0 nm, and desirably has a thickness on the order of approximately 0.8 nm. For this particular thickness range of the non-magnetic coupling layer 16, the magnetizations of the first magnetic layer 15 and the second magnetic layer 17 (which will be described later) are antiparallel.

The second magnetic layer 17 is made of a material such as Co or a Co alloy such as CoCr, CoCrTa, CoCrPt, CoCrPt—M, where M=B, Mo, Nb, Ta, W, Cu or alloys thereof. Especially when using a Co alloy for the second magnetic layer 17, the Co concentration of the Co alloy may be set high, that is, the Co alloy may be Co rich, so as to make the exchange coupling field large. For example, the second magnetic layer 17 preferably has a thickness in the range of 2 to 30 nm. Of course, the layer structure of the second magnetic layer 17 is not limited to a single-layer structure, and the second magnetic layer 17 may employ a multi-layer structure.

The protection layer 18 may be made of C, for example. In addition, the lubricant layer 19 is preferably made of an organic lubricant, for example, for use with a magnetic transducer such as a spin-valve head. The protection layer 18 and the lubricant layer 19 form a protection layer structure at the recording surface of the magnetic recording medium 10.

Obviously, the layer structure under the exchange layer structure is not limited to that shown in FIG. 1. For example, the underlayer 13 may be made of Cr or a Cr alloy and formed to a thickness in the range of 5 to 40 nm on the non-magnetic substrate 11, and the first magnetic layer 15 may be provided on this underlayer 13. In addition, although the first and second magnetic layers 15 and 17 having the antiparallel magnetizations are respectively formed by one magnetic layer each in this embodiment, it is possible, for example, to additionally provide under the first magnetic layer 15 one or more magnetic layers having antiparallel magnetization with respect to an adjacent magnetic layer. In this case, an exchange coupling field Hex of each additionally provided magnetic layer is set larger than a coercivity Hc2 of the second magnetic layer 17, so that the magnetizations (magnetization directions) of each additionally provided magnetic layer rotate together with the first and second magnetic layers 15 and 17.

The magnetic recording medium 10 having the basic structure described above is characterized in that the first and second magnetic layers 15 and 17 maintain the antiparallel magnetization states at the time of recording, and the magnetization directions of the first and second magnetic layers 15 and 17 rotate together. For this reason, it is desirable that the recording magnetic field (hereinafter simply referred to as a recording field) that is applied to the magnetic recording medium 10 is in a range that does not create a switching magnetic field (hereinafter simply referred to as a switching field) Hsw* that acts to switch the magnetization of the first magnetic layer 15 to become parallel to the magnetization of the second magnetic layer 17. The position of the switching field Hsw* can be found from a coercivity Hc1 of the first magnetic layer 15 and an exchange coupling field Hex1 of the first magnetic layer 15 which is generated by the exchange coupling of the first and second magnetic layers 15 and 17, as will be described later in more detail.

The exchange coupling field Hex is the field which is generated by the exchange coupling of the first and second magnetic layers 15 and 17. Generally, the exchange coupling field Hex1 of the first magnetic layer 15 can be obtained from Hex1=J/t1Ms1, where J denotes an exchange coupling constant, t1 denotes a thickness of the first magnetic layer 15, and Ms1 denotes a magnetization of the first magnetic layer 15. Similarly, an exchange coupling field Hex2 of the second magnetic layer 17 can be obtained from Hex2=J/t2Ms2, where J denotes the exchange coupling constant, t2 denotes a thickness of the second magnetic layer 17, and Ms2 denotes a magnetization of the second magnetic layer 17. In this specification, a description will be given by focusing on the exchange coupling field Hex1 generated in the first magnetic layer 15.

When the exchange coupling field Hex1 is set to be larger than both the coercivity Hc1 of the first magnetic layer 15 and the coercivity Hc2 of the second magnetic layer 17, it is possible to make the magnetizations of the first and second magnetic layers 15 and 17 mutually antiparallel. In addition, because the desired switching field Hsw* can be obtained from the sum of the exchange coupling field Hex1 and the coercivity Hc1 of the first magnetic layer 15, as will be described later, it is possible to carry out the recording while maintaining the magnetizations of the first and second magnetic layers 15 and 17 in an antiparallel state by applying on the magnetic recording medium 10 a recording field which does not reach the level of the switching field Hsw*.

Furthermore, when the coercivity Hc1 of the first magnetic layer 15 is set to be large, the difference between the coercivity Hc2 of the second magnetic layer 17 and the switching field Hsw* can be made large, to thereby enable an increased degree of freedom of design of the magnetic recording medium 10.

In this specification, the switching field Hsw* refers to the field which switches the magnetization of the first magnetic layer 15 to become parallel to the magnetization of the second magnetic layer 17 when an external field is applied to the magnetic recording medium 10 while increasing the field strength, in a state where the coercivity Hc2 of the second magnetic layer 17 is smaller than the exchange coupling field Hex1.

Next, a more detailed description will be given of the characterizing structures described above which are included in the magnetic recording medium 10.

In this embodiment, the coercivity Hc2 of the second magnetic layer 17 is set to approximately 4 kOe, and the coercivity Hc1 of the first magnetic layer 15 is set to approximately 0.5 kOe, for example. Hence, the coercivity Hc2 of the second magnetic layer 17 is sufficiently large compared to the coercivity Hc1 of the first magnetic layer 15.

The magnetization and thickness product t2Ms2 of the second magnetic layer 17 is set to be larger than the magnetization and thickness product t1Ms1 of the first magnetic layer 15. For this reason, the difference that is obtained by subtracting the magnetization and thickness product t1Ms1 of the first magnetic layer 15 from the magnetization and thickness product t2Ms2 of the second magnetic layer 17 mainly contributes to the signal at the time of the reproduction. In addition, since the magnetization and thickness product t1Ms1 of the first magnetic layer 15 is set to be small, the exchange coupling field Hex1 can be made large, because Hex1=J/t1Ms1 as described above.

Furthermore, in the magnetic recording medium 10 of this embodiment, it is desirable to provide a coupling intensifying region for intensifying the exchange coupling strength between the second magnetic layer 17 and the first magnetic layer 15, in addition to the basic structure shown in FIG. 1.

Figure 2:
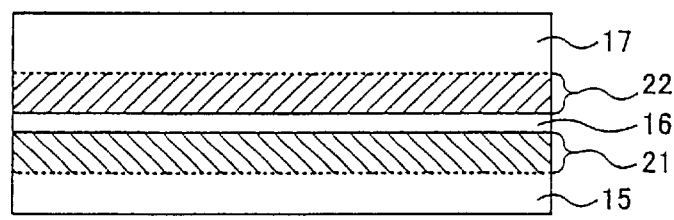
FIG. 2 is an enlarged cross-sectional view showing the main parts of a modification of the FIG. 1 embodiment of the magnetic recording medium.

FIG. 2 is an enlarged cross-sectional view showing a portion of a modification of the FIG. 1 embodiment of the magnetic recording medium 10 that includes the coupling intensifying region. More particularly, FIG. 2 shows the layer structure of the part of this modification of the magnetic recording medium 10, including a coupling intensifying region provided between the non-magnetic coupling layer 16 and the first and second magnetic layers 15 and 17.

In the layer structure shown in FIG. 2, a lower coupling intensifying region 21 is provided between the first magnetic layer 15 and the non-magnetic coupling layer 16, and an upper coupling intensifying region 22 is provided between the non-magnetic coupling layer 16 and the second magnetic layer 17. However, it is not essential to provide both the upper and lower coupling intensifying regions 21 and 22, and only one of the upper and lower coupling intensifying regions 21 and 22 may be provided. The magnetization of the lower coupling intensifying region 21 is parallel to the magnetization of the first magnetic layer 15, and the magnetization of the upper coupling intensifying region 22 is parallel to the magnetization of the second magnetic layer 17. The lower coupling intensifying region 21, together with the first magnetic layer 15, has a function of intensifying the exchange coupling between the first and second magnetic layers 15 and 17. Similarly, the upper coupling intensifying region 22, together with the second magnetic layer 17, has a function of intensifying the exchange coupling between the first and second magnetic layers 15 and 17. The exchange coupling between the first and second magnetic layers 15 and 17 can be intensified even when only one of the upper and lower coupling intensifying regions 22 and 21 is provided.

The lower coupling intensifying region 21 may be formed as a portion of either the first magnetic layer 15 or the non-magnetic coupling layer 16, or it may be formed as an interface on the surface of the first magnetic layer 15 or on the non-magnetic coupling layer 16. In addition, the lower coupling intensifying region 21 may be formed as a full layer with a relatively uniform thickness or it may be formed as a series of projections. Similarly, the upper coupling intensifying region 22 may be formed as a portion of either the second magnetic layer 17 or the non-magnetic coupling layer 16, or it may be formed as an interface on the surface of the second magnetic layer 17 or the non-magnetic coupling layer 16. Further, the upper coupling intensifying region 22 may be formed as a full layer with a relatively uniform thickness or it may be formed as a series of projections.

The upper and lower coupling intensifying regions 22 and 21 are preferably made of Fe, Co, Ni or alloys thereof. It is particularly desirable to use materials such as Co, CoCr and CoCrTa for the upper and lower coupling intensifying regions 22 and 21. Moreover, the upper and lower coupling intensifying regions 22 and 21 may also be made of Co—X, CoCr—Y or CoCrTa—Y, where X=Pt, Ta, B, Cu, W, Mo, Nb, Ru, Rh, Ir or alloys thereof, and Y=Pt, B, Cu, W, No, Nb, Ru, Rh, Ir or alloys thereof.

It is desirable that the maximum thickness of the material forming each of the upper and lower coupling intensifying regions 22 and 21 is limited to approximately 2 nm. In addition, the material forming each of the upper and lower coupling intensifying regions 22 and 21 may exist in a surface state or in a dispersed state. For example, the function of intensifying the exchange coupling strength is sufficiently displayed even in a state where a desired material used is dispersed in a granular state within or on the surface of the first magnetic layer 15, for example. Accordingly, even in a state where only a small amount of the desired material is dispersed within or on the surface of the first magnetic layer 15, for example, the dispersed material as a whole can sufficiently function as a coupling intensifying region.

The thickness of the desired material within each of the upper and lower coupling intensifying regions 22 and 21 is approximately 2.0 nm or less. Because the characteristics required of the magnetic recording medium 10 change depending on the material that is used to form the upper and lower coupling intensifying regions 22 and 21, it is desirable to determine the thickness of the material forming each of the upper and lower coupling intensifying regions 22 and 21 by taking such factors into consideration.

The materials such as Fe, Co, Ni and alloys thereof, which are suited for forming the upper and lower coupling intensifying regions 22 and 21, may also be used to form the first and second magnetic layers 15 and 17. Hence, the composition of the material forming the upper and lower coupling intensifying regions 22 and 21 may be the same as, or similar to, the composition of the material forming the upper and lower magnetic layers 15 and 17. However, it is desirable that the material forming the upper and lower coupling intensifying regions 22 and 21 is richer in Co (or the like) compared to the material forming the first and second magnetic layers 15 and 17. For example, compared to materials which include Co and are generally used to form a magnetic layer, it is desirable that the Co-content of the material forming the upper and lower coupling intensifying regions 22 and 21 is at least 10 at % to 20 at % richer. Therefore, even in a case where materials having similar compositions are used for the upper and lower coupling intensifying regions 22 and 21 and the first and second magnetic layers 15 and 17, the upper and lower coupling intensifying regions 22 and 21 are Co rich compared to the first and second magnetic layers 15 and 17.

The materials described above which are rich in Co (or the like) may also be used to form the first and second magnetic layers 15 and 17. In this case, the lower coupling intensifying region 21 is included in the first magnetic layer 15, and the surface of the first magnetic layer 15 (that is, the interface between the first magnetic layer 15 and the non-magnetic coupling layer 16) substantially corresponds to the lower coupling intensifying region 21. In addition, the upper coupling intensifying region 22 is included in the second magnetic layer 17, and the surface of the second magnetic layer 17 (that is, the interface between the second magnetic layer 17 and the non-magnetic coupling layer 16) substantially corresponds to the upper coupling intensifying region 22. Hence, it is unnecessary in this case to prepare a material for separately forming the upper and lower coupling intensifying regions 22 and 21.

Accordingly, the lower coupling intensifying region 21 simply needs to exist substantially at a boundary of the first magnetic layer 15 and the non-magnetic coupling layer 16, and the upper coupling intensifying region 22 simply needs to exist substantially at a boundary of the second magnetic layer 17 and the non-magnetic coupling layer 16.

In this modification, the upper and lower coupling intensifying regions 22 and 21 are preferably respectively made of Co having a thickness of 1 nm. By employing the layer structure which includes the upper and lower coupling intensifying regions 22 and 21, the exchange coupling strength between the first and second magnetic layers 15 and 17 is increased. In addition, among the coercivity Hc2 of the second magnetic layer 17, the coercivity Hc1 of the first magnetic layer 15 and the exchange coupling field Hex1 of the first magnetic layer 15, both the coercivities Hc1 and Hc2 are smaller than the exchange coupling field Hex1. According to this layer structure, the coercivity Hc12 is naturally smaller than the switching field Hsw*.

Figure 3:
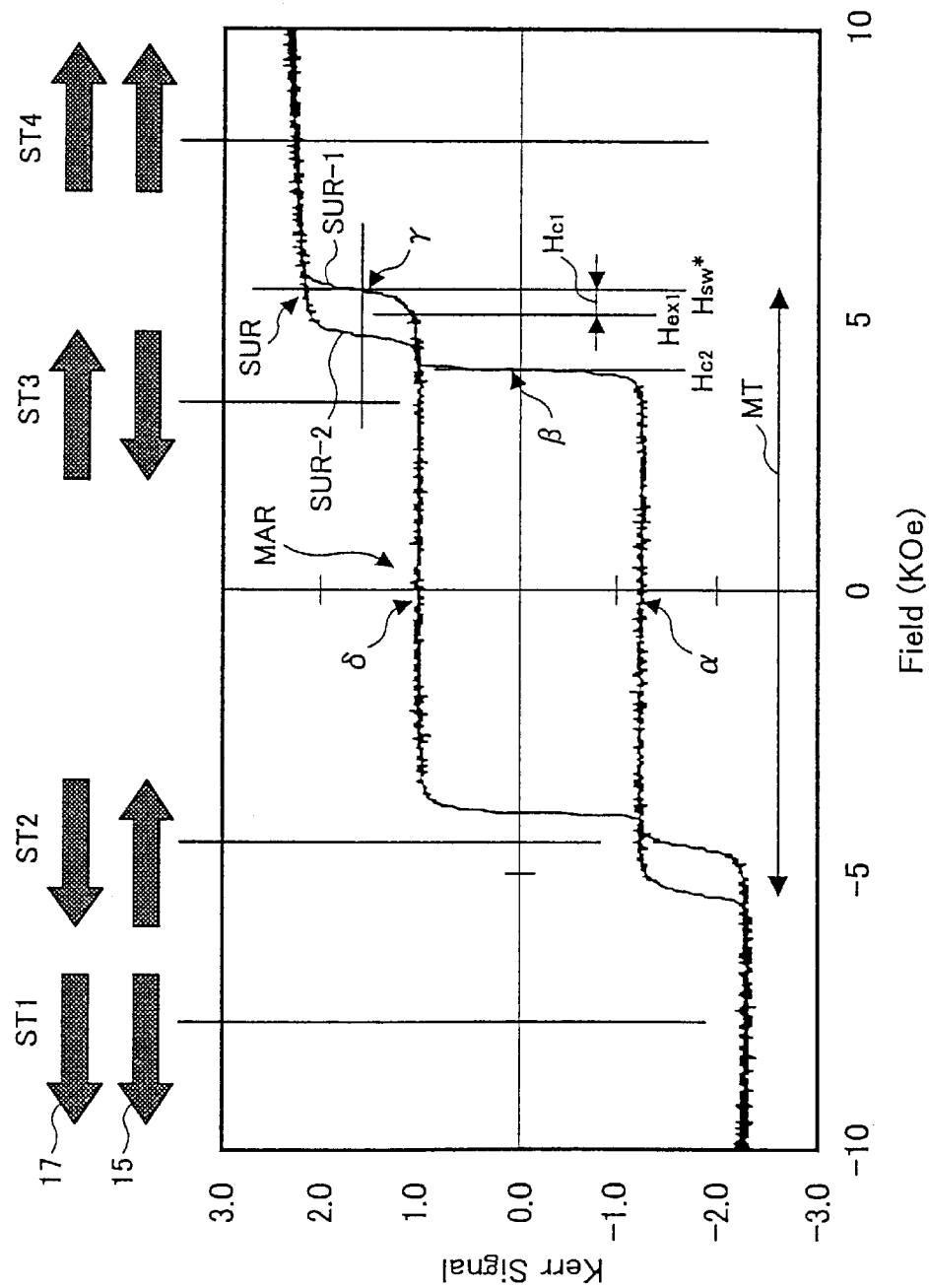
FIG. 3 is a diagram showing a hysteresis loop of the FIG. 2 modification of the magnetic recording medium.

FIG. 3 is a diagram showing a hysteresis loop of the FIG. 2 modification of the magnetic recording medium 10. More particularly, FIG. 3 shows the hysteresis loop in which the abscissa indicates the field and the ordinate indicates the Kerr signal due to the Kerr effect. It should be noted that the hysteresis loop of the FIG. 1 embodiment will be of a similar shape to that shown in FIG. 3, except that the various parameters will be somewhat shifted.

Arrows ST1 through ST4 indicated in the upper part of FIG. 3 respectively indicate magnetization states (i.e., the states of the direction of magnetization) of the first and second magnetic layers 15 and 17. The hysteresis loop shown in FIG. 3 includes a main hysteresis loop MAR at a central portion, and a sub-hysteresis loop SUR on both the right and left portions.

The large main hysteresis loop MAR is shown for a case where the magnetizations of the first and second magnetic layers 15 and 17 rotate together while maintaining the antiparallel state, that is, for a case where the state ST2 and the state ST3 are repeated.

On the other hand, the small sub-hysteresis loop SUR on the right shows a case where the magnetization of the first magnetic layer 15 switches from the antiparallel state to the parallel state with respect to the magnetization of the second magnetic layer 17, and vice versa. In FIG. 3, $\gamma$ indicates a position of the switching field Hsw* where the magnetization of the first magnetic layer switches from the antiparallel state to the parallel state with respect to the magnetization of the second magnetic layer 17.

The sub-hysteresis loop SUR may be regarded as a hysteresis loop (minor loop) indicating the magnetization state of the first magnetic layer 15. In other words, when a field is applied in a positive direction (+10 kOe) from a state (residual magnetization state) indicated by $\delta$, the sub-hysteresis loop SUR passes the position $\gamma$ and follows SUR-1 on the right side. In this state, the magnetization of the first magnetic layer 15 switches from the state ST3, which is antiparallel to the magnetization of the second magnetic layer 17, to the state ST4, which is parallel to the magnetization of the second magnetic layer 17. On the other hand, when the field is reduced from the state ST4 (i.e., is reduced by 10 kOe), the sub-hysteresis loop SUR follows SUR-2 on the left side. In this state, the magnetization of the first magnetic layer 15 switches from the state ST4 which is parallel to the magnetization of the second magnetic layer 17 to the state ST3 which is antiparallel to the magnetization of the second magnetic layer 17.

Therefore, as may be seen from FIG. 3, the magnetizations of the first and second magnetic layers 15 and 17 can be maintained in the antiparallel state when the recording field is applied in a range of the main hysteresis loop MAR in which the applied field is smaller than the switching field Hsw*, as indicated by $\gamma$.

The approximate center of the sub-hysteresis loop SUR indicates the exchange coupling field Hex1 of the first magnetic layer 15. In addition, in the main hysteresis loop MAR, $\beta$ indicates the strength of the field which rotates the magnetizations while maintaining the magnetizations of the first and second magnetic layers 15 and 17 antiparallel. The strength $\beta$ approximately corresponds to the coercivity Hc2 of the second magnetic layer 17.

The conditions for rotating the magnetizations of the first and second magnetic layers 15 and 17 together while maintaining the magnetizations of the first and second magnetic layers 15 and 17 antiparallel are that at least the coercivity Hc2 of the second magnetic layer 17 is smaller than the exchange coupling field Hex1 of the first magnetic layer 15, and that the field applied to the magnetic recording medium 10 is not larger than the switching field Hsw*.

Since the sub-hysteresis loop SUR may be regarded as indicating the magnetization state of the first magnetic layer 15 as described above, a difference between the exchange coupling field Hex1 of the first magnetic layer 15 and the switching field Hsw* may be regarded as the coercivity Hc1 of the first magnetic layer 15. Hence, the switching field Hsw* is equal to the sum of the exchange coupling field Hex1 and the coercivity Hc1 of the first magnetic layer 15 (Hsw*=Hex1+Hc1).

In the particular case shown in FIG. 3, the coercivity Hc2 of the second magnetic layer 17 satisfies the condition Hc2<Hex1, and naturally, Hc2<(Hex1+Hc1), and Hc2<Hsw*. In this case, the position of the switching field Hsw* can be prescribed by use of the exchange coupling field Hex1 and the coercivity Hc1 of the first magnetic layer 15, and used when designing the magnetic recording medium 10.

By using a recording field within the range MT shown in FIG. 3, which satisfies the relationship Hc2 and <Hsw*, it is possible to carry out the recording on the magnetic recording medium 10 while maintaining the magnetizations of the first and second magnetic layers 15 and 17 in the antiparallel state.

Although the description above is given with respect to the sub-hysteresis loop SUR on the right in FIG. 3, the sub-hysteresis loop on the left is approximately symmetrical, with respect to the origin, to the loop on the right. Accordingly, a description of the sub-hysteresis loop on the left will be omitted in this specification.

Next, a more detailed description will be given of the hysteresis loop shown in FIG. 3 with reference to numerical values. In this modification of the magnetic recording medium 10, the coupling intensifying regions 21 and 22 are provided to intensify the exchange coupling of the first and second magnetic layers 15 and 17. Accordingly, the exchange coupling field Hex between the first and second magnetic layers 15 and 17 is improved to approximately 5 kOe, and the switching field Hsw* is approximately 5.5 kOe.

The exchange coupling field Hex1 of the first magnetic layer 15 is set to be larger than the coercivity Hc2 of the second magnetic layer 17, and the coercivity Hc2 of the second magnetic layer 17 and the switching field Hsw* satisfy the relationship Hc2<Hsw*.

When the above described relationships are satisfied, it is possible to always maintain the magnetizations of the first and second magnetic layers 15 and 17 in the antiparallel state while a recording field is applied from a residual magnetization state indicated by $\alpha$ and the switching of the magnetizations occurs as indicated by $\beta$ in FIG. 3. In other words, in the state $\alpha$ (the residual magnetization state), the magnetizations of the first and second magnetic layers 15 and 17 are in the antiparallel state ST2, but when a recording field is applied in a direction opposite to the magnetization of the second magnetic layer 17, the magnetization of the second magnetic layer 17 switches to the state ST3, approximately at the position indicated by $\beta$, when the recording field becomes larger than the coercivity Hc2 of the second magnetic layer 17.

In this case, the coercivity Hc2 of the second magnetic layer 17 and the exchange coupling field Hex1 of the first magnetic layer 15 satisfy the relationship Hc2<Hex1. For this reason, the first magnetic layer 15 is strongly coupled to the second magnetic layer 17, and the magnetization of the first magnetic layer 15 switches simultaneously with the magnetization of the second magnetic layer 17, while the magnetizations of the first and second magnetic layers 15 and 17 are maintained antiparallel. This antiparallel state of the magnetizations of the first and second magnetic layers 15 and 17 is maintained in the residual magnetization state, that is, at the position indicated by δ, where the recording field becomes zero.

In other words, in the above described state where the magnetizations of the first and second magnetic layers 15 and 17 are maintained antiparallel, the exchange coupling strength (or force) which acts to maintain the magnetizations of the first and second magnetic layers 15 and 17 antiparallel is larger than the external recording field which is applied to the magnetic recording medium 10.

Figure 4A:
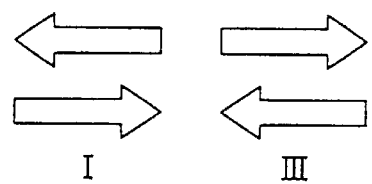
FIGS. 4A and 4B respectively are diagrams showing switching of the magnetizations in the FIG. 2 modification of the magnetic recording medium and a previously proposed magnetic recording medium.
Figure 4B:
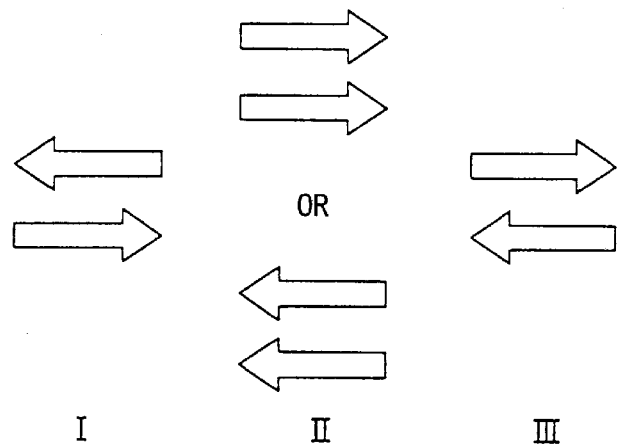

FIGS. 4A and 4B, respectively, are diagrams showing switching of the magnetizations in the present invention of the magnetic recording medium 10 and a previously proposed magnetic recording medium which has been proposed in U.S. patent application Ser. No. 09/425,788 described above.

In the case of the present magnetic recording medium 10, the switching process is completed by switching of the magnetizations once by a predetermined recording field from state I to state III or vice versa, as shown in FIG. 4A.

But in the case of the previously proposed magnetic recording medium, the switching of the state I to the state III can only be realized via a state II in which the magnetization of the ferromagnetic layer corresponding to the first magnetic layer 15 is parallel to the magnetization of the magnetic layer corresponding to the second magnetic layer 17. In other words, a transition from state I to state II and another transition from state II to state III are required in order to realize the switching from state I to state III, and a transition from state III to state II and another transition from state II to state I are required in order to realize the switching from state III to state I.

Therefore, as may be seen from a comparison of FIGS. 4A and 4B, the present magnetic recording medium 10 can realize a higher speed of recording as compared with the previously proposed magnetic recording medium because of the high-speed switching of the magnetizations directly from state I to state III, and vice versa.

In the present invention, the coupling intensifying region is used to further improve the exchange coupling between the first and second magnetic layers 15 and 17. However, the exchange coupling strength between the first and second magnetic layers 15 and 17 may also be adjusted by altering the state of the interface of the material forming the non-magnetic coupling layer 16. For example, the exchange coupling strength between the first and second magnetic layers 15 and 17 may be adjusted by altering the interface state of Ru which forms the non-magnetic coupling layer 16. In addition, the exchange coupling strength between the first and second magnetic layers 15 and 17 may also be adjusted and increased by altering the composition and the thickness of each of the first and second magnetic layers 15 and 17, by altering the state of the magnetic grains of each of the first and second magnetic layers 15 and 17, or by improving the smoothness of the Ru interface or the like between the non-magnetic coupling layer 16 and the first magnetic layer 15 and/or the second magnetic layer 17. More particularly, the exchange coupling strength between the first and second magnetic layers 15 and 17 may be increased by decreasing the thickness of the first magnetic layer 15 and/or the second magnetic layer 17, by increasing the Co-content (or the Co concentration) of the first magnetic layer 15 and/or the second magnetic layer 17, or by increasing the magnetic grain size of the first magnetic layer 15 and/or the second magnetic layer 17.

On the other hand, the above described relationship between the coercivity $Hc2$ of the second magnetic layer 17 and the exchange coupling field $Hex1$ of the first magnetic layer 15 may be maintained, without changing the exchange coupling strength (that is, maintaining the exchange coupling strength approximately constant), by decreasing the coercivity $Hc2$ of the second magnetic layer 17. More particularly, the coercivity $Hc2$ of the second magnetic layer 17 may be adjusted by changing the material, the additives and the production process of the second magnetic layer 17, so as to change the microstructure, the crystal structure and the magnetic domain structure. For example, when forming the second magnetic layer 17 from CoCrPtB, it is possible to decrease the coercivity $Hc2$ by suppressing the Pt-content of CoCrPtB.

Furthermore, increasing the coercivity $Hc1$ of the first magnetic layer 15 is also one method of satisfying the relationship $Hc2<Hex1+Hc1$. However, if the coercivity $Hc1$ is increased excessively, there are cases where it is no longer possible to maintain the antiparallel state of the magnetizations of the first and second magnetic layers 15 and 17 in the residual magnetization state. Accordingly, it is also necessary to design the coercivity $Hc1$ to be smaller than the exchange coupling field $Hex1$.

One important aspect of the magnetic recording medium 10 of both the FIG. 1 embodiment and the FIG. 2 modification is that the magnetizations of the first and second magnetic layers 15 and 17 are switched, while still maintaining the magnetizations of the first and second magnetic layers 15 and 17 antiparallel, by applying a recording field to the medium 10 that is larger than the coercivity $Hc2$, and by using various methods to control the exchange coupling field $Hex1$ of the first magnetic layer 15, the coercivity $Hc2$ of the second magnetic layer and the coercivity $Hc1$ of the first magnetic layer 15. In addition, the recording field that is applied to the magnetic recording medium 10 also needs to be smaller than the switching field $Hsw^*$. As a result, it is possible to carry out a high-speed switching process that switches the magnetizations of the first and second magnetic layers 15 and 17 while maintaining the magnetizations of the first and second magnetic layers 15 and 17 antiparallel.

As may be seen from FIG. 3, if the recording field applied to the magnetic recording medium 10 is large when compared to the switching field $Hsw^*$, the magnetization of the first magnetic layer 15 becomes parallel to the magnetization of the second magnetic layer 17, which is not desirable. Accordingly, the maximum value of the recording field should be larger than the coercivity $Hc2$ of the second magnetic layer 17, but smaller than the switching field $Hsw^*$, that is, the maximum recording field should be set to be within a range between β and γ in FIG. 3. In other words, it is desirable that the maximum value of the recording field from the recording head does not exceed the switching field $Hsw^*$.

Therefore, by controlling the coercivity $Hc2$ of the second magnetic layer 17 and the exchange coupling field $Hex1$ of the first magnetic layer 15 so as to satisfy the relationship $Hc2<Hex1$ and by keeping the recording field from the recording head from exceeding the switching field $Hsw^*$, it is possible to switch the magnetizations of the first and second magnetic layers 15 and 17 while maintaining these magnetizations antiparallel. Unlike the previously proposed magnetic recording medium described above, in the present invention, state II, in which the magnetizations of the first and second magnetic layers 15 and 17 become parallel, does not exist during the recording process, and for this reason, the present invention can realize high-speed recording. The deterioration of the non-linear transition shift (NLTS) due to the causes described above will thus not occur in the present invention. In addition, normal reproduction is possible even when high-speed reproduction is carried out immediately after recording.

Figure 5:
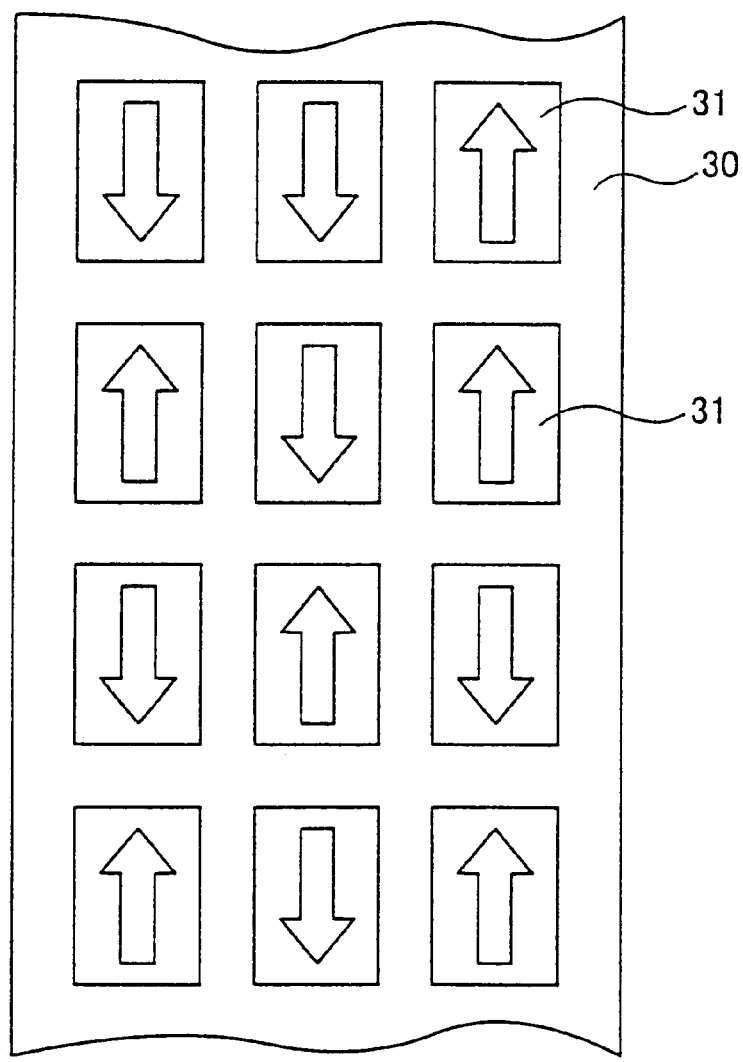
FIG. 5 is a diagram showing a portion of a recording surface of a patterned medium on an enlarged scale.

FIG. 5 is a diagram showing a portion of a recording surface of a so-called patterned medium on an enlarged scale. The patterned medium 30 shown in FIG. 5 has a storage capacity per unit area several times greater than those of a conventional magnetic recording media. Unlike the structures of the conventional magnetic recording media, the patterned medium 30 has unit recording portions 31 which are artificially designed as micro-magnetic recording regions that are formed by a lithography technique, or the like. Boundaries of adjacent unit recording portions 31 are separated on the recording surface of the patterned medium 30 to thereby realize low noise. Hence, it is unnecessary to use an additive such as Cr to promote segregation and grain size reduction. For this reason, the magnetic layer may be made of a material having a small additive content and a large Co-content (Co concentration). That is, it is possible to use a material that can obtain a large exchange coupling. As a result, it is possible to easily satisfy the following relationship of the exchange coupling field Hex1 of the first magnetic layer 15, in which the exchange coupling field Hex1 is larger than the coercivities Hc1 and Hc2 of the first and second magnetic layers 15 and 17.

In another embodiment of the magnetic recording medium according to the present invention, the present invention is applied to the patterned medium 30 described above. More particularly, in this embodiment, each unit recording portion 31 has a stacked structure which includes at least the first magnetic layer 15, the non-magnetic coupling layer 16 and the second magnetic layer 17 which satisfy the relationships of the FIG. 1 embodiment and the FIG. 2 modification described above. According to this embodiment, it is possible to realize a magnetic recording medium which has a high recording density which is further improved and can carry out high-speed recording and reproduction which is also further improved.

In the embodiments and the modification described above, the first magnetic layer 15, the non-magnetic coupling layer 16 and the second magnetic layer 17 are stacked in this order above the non-magnetic substrate 11. However, it is of course possible to stack the second magnetic layer 17, the non-magnetic coupling layer 16 and the first magnetic layer 15 in this order above the non-magnetic substrate 11. However, in general, it is desirable to arrange the magnetic layer which dominates the recording on the side of the magnetic recording medium that is closer to the head.

Figure 6:
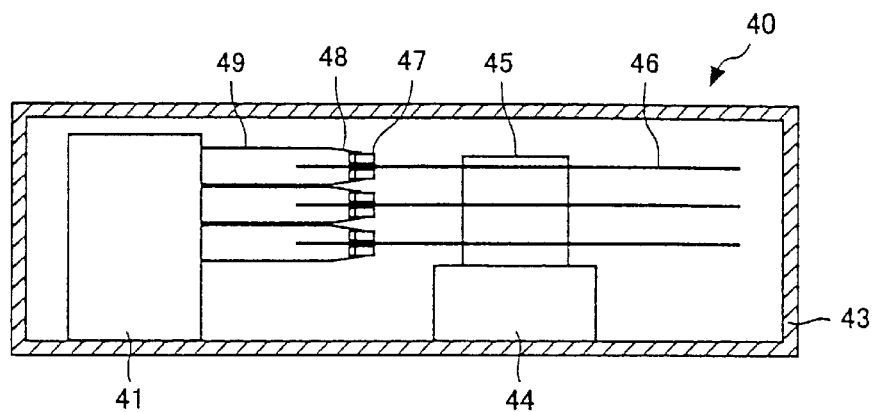
FIG. 6 is a cross-sectional view showing the main parts of one embodiment of a magnetic storage apparatus according to the present invention.

Next, a description will be given of an embodiment of a magnetic storage apparatus according to the present invention by referring to FIGS. 6 and 7. FIG. 6 is a cross-sectional view showing the basic parts of this embodiment of the magnetic storage apparatus according to the present invention, and FIG. 7 is a plan view of the magnetic storage apparatus shown in FIG. 6.

Figure 7:
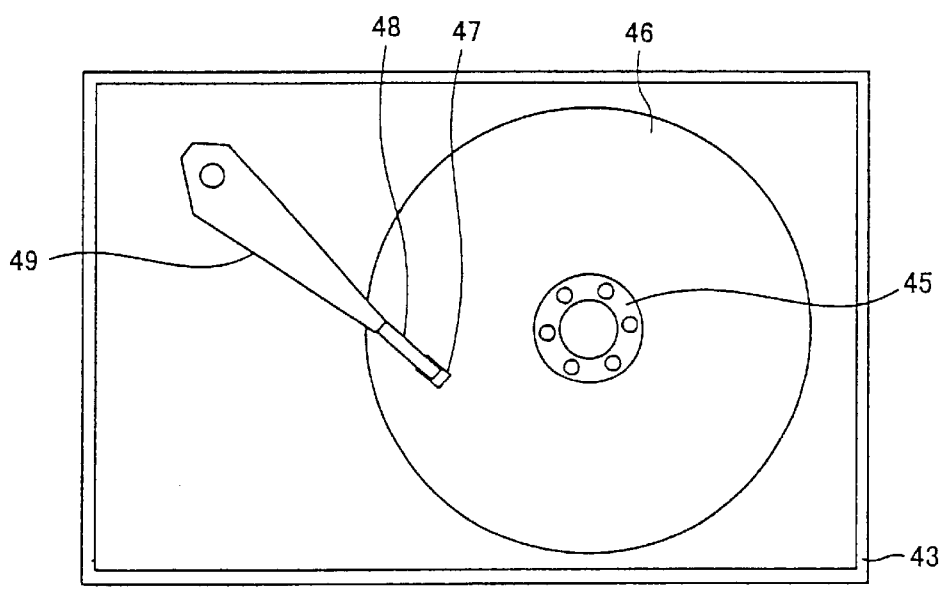
FIG. 7 is a plan view showing the main parts of the magnetic storage apparatus shown in FIG. 6.

As shown in FIGS. 6 and 7, the magnetic storage apparatus 40 generally includes a housing 43. A motor 44, a hub 45, a plurality of magnetic recording media 46, a plurality of recording and reproducing heads 47, a plurality of suspensions 48, a plurality of arms 49, and an actuator unit 41 are all provided within the housing 43. The magnetic recording media 46 are mounted on the hub 45 which is rotated by the motor 44. Each recording and reproducing head 47 is mounted on the tip end of a corresponding arm 49 via the suspension 48. The arms 49 are moved by the actuator unit 41. The basic construction of this magnetic storage apparatus is known, and a detailed description thereof will be omitted in this specification.

This embodiment of the magnetic storage apparatus is characterized by the magnetic recording media 46. Each magnetic recording medium 46 has the structure of any of the embodiments and the modification of the magnetic recording medium described above in conjunction with FIGS. 1 through 5. In addition, the recording field that is applied to the magnetic recording medium 46 from the recording head of the recording and reproducing head 47 is controlled to be both larger than the coercivity Hc2 of the second magnetic layer of the magnetic recording medium 46 and smaller than the switching field Hsw*. Of course, the number of magnetic recording media 46 is not limited to three, and for example, one, two, four or more magnetic recording media 46 may be provided.

The basic construction of the magnetic storage apparatus is not limited to that shown in FIGS. 6 and 7. In addition, the magnetic recording medium used in the present invention is not limited to a magnetic disk.

Further, the present invention is not limited to these embodiments, but various variations and modifications may be made without departing from the scope of the present invention.

What is claimed is:

1. A magnetic recording medium comprising:
    a first magnetic layer having a coercivity Hc1;
    a second magnetic layer having a coercivity Hc2; and
    a non-magnetic coupling layer provided between the first and second magnetic layers so that the first and second magnetic layers are exchange-coupled and magnetizations of the first and second magnetic layers are anti-parallel;
    said first magnetic layer having an exchange coupling field Hex1 that is larger than both said coercivity Hc1 and said coercivity Hc2.

2. The magnetic recording medium as claimed in claim 1, wherein a switching field Hsw* which switches the magnetization of said first magnetic layer to become parallel to the magnetization of said second magnetic layer is set to the sum of said exchange coupling field Hex1 and said coercivity Hc1.

3. The magnetic recording medium as claimed in claim 1, wherein a magnetization and thickness product t1Ms1 of said first magnetic layer is smaller than a magnetization and thickness product t2Ms2 of said second magnetic layer, where t1 denotes a thickness of said first magnetic layer, Ms1 denotes a magnetization of said first magnetic layer, t2 denotes a thickness of said second magnetic layer, and Ms2 denotes a magnetization of said second magnetic layer.

4. The magnetic recording medium as claimed in claim 1, wherein said coercivity Hc1 is smaller than said coercivity Hc2.

5. The magnetic recording medium as claimed in claim 1, further comprising:
    a coupling intensifying region, provided near a boundary of said first magnetic layer and said non-magnetic coupling layer, wherein said coupling intensifying region intensifies an exchange coupling strength between said first magnetic layer and said second magnetic layer.

6. The magnetic recording medium as claimed in claim 5, wherein said coupling intensifying region is made of a material selected from a group consisting of Fe, Co, Ni and alloys thereof.

7. The magnetic recording medium as claimed in claim 1, further comprising:
a coupling intensifying region, provided near a boundary of said second magnetic layer and said non-magnetic coupling layer, wherein said coupling intensifying region intensifies an exchange coupling strength between said first magnetic layer and said second magnetic layer.

8. The magnetic recording medium as claimed in claim 7, wherein said coupling intensifying region is made of a material selected from a group consisting of Fe, Co, Ni and alloys thereof.

9. The magnetic recording medium as claimed in claim 1, further comprising:
a first coupling intensifying region, provided near a boundary of said first magnetic layer and said non-magnetic coupling layer, wherein said first coupling intensifying region intensifies an exchange coupling strength between said first magnetic layer and said second magnetic layer; and
a second coupling intensifying region, provided near a boundary of said second magnetic layer and said non-magnetic coupling layer, wherein said second coupling intensifying region intensifies the exchange coupling strength between said first magnetic layer and said second magnetic layer.

10. The magnetic recording medium as claimed in claim 9, wherein at least one of said first coupling intensifying region and said second coupling intensifying region is made of a material selected from a group consisting of Fe, Co, Ni and alloys thereof.

11. The magnetic recording medium as claimed in claim 1, which is formed as a patterned medium, and wherein said first magnetic layer, said non-magnetic coupling layer and said second magnetic layer are stacked within each of a plurality of unit recording portions of the patterned medium.

12. A patterned medium comprising:
a recording surface; and
a plurality of unit recording portions, provided on said recording surface, having boundaries which are separated from adjacent unit recording portions,
each of said plurality of unit recording portions having a stacked structure comprising:
a first magnetic layer having a coercivity $Hc1$;
a second magnetic layer having a coercivity $Hc2$; and
a non-magnetic coupling layer provided between said first magnetic layer and said second magnetic layer so that said first and second magnetic layers are exchange-coupled and magnetizations of said first and second magnetic layers are antiparallel;
said first magnetic layer having an exchange coupling field $Hex1$ which is larger than both said coercivity $Hc1$ and said coercivity $Hc2$.

13. The patterned medium as claimed in claim 12, further comprising:
a coupling intensifying region, provided near a boundary of said non-magnetic coupling layer and at least one of said first and second magnetic layers, wherein said coupling intensifying region intensifies an exchange coupling strength between said first magnetic layer and said second magnetic layer.

14. A magnetic storage apparatus comprising:
at least one magnetic recording medium; and
at least one head adapted to apply a field to the magnetic recording medium;
said magnetic recording medium including:
a first magnetic layer having a coercivity $Hc1$;
a second magnetic layer having s coercivity $Hc2$; and
a non-magnetic coupling layer provided between said first magnetic layer and said second magnetic layer so that said first and second magnetic layers are exchange-coupled and magnetizations of said first and second magnetic layers are antiparallel,
said first magnetic layer having an exchange coupling field $Hex1$ which is larger than both said coercivity $Hc1$ and said coercivity $Hc2$.

15. The magnetic storage apparatus as claimed in claim 14, wherein the field from said head is larger than said coercivity $Hc2$ and smaller than a switching field $Hsw^*$ which switches the magnetization of said first magnetic layer to become parallel to the magnetization of said second magnetic layer.

16. The magnetic storage apparatus as claimed in claim 15, wherein said switching field $Hsw^*$ is set to a sum of the exchange coupling field $Hex1$ and said coercivity $Hc1$.

17. The magnetic recording medium as claimed in claim 5, wherein the coupling intensifying region includes a material dispersed within a boundary portion of at least one of said first and second magnetic layers.

* * * * *